(12) United States Patent
Leak et al.

(10) Patent No.: US 6,668,378 B2
(45) Date of Patent: *Dec. 23, 2003

(54) INTERACTIVE TELEVISION TRIGGERS HAVING CONNECTED CONTENT/DISCONNECTED CONTENT ATTRIBUTE

(75) Inventors: Bruce A. Leak, Los Altos, CA (US); Daniel J. Zigmond, Carnation, WA (US); Dean J. Blackketter, San Francisco, CA (US)

(73) Assignee: WebTV Networks, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,247

(22) Filed: Jun. 30, 1999

(65) Prior Publication Data

US 2003/0126621 A1 Jul. 3, 2003

(51) Int. Cl.[7] .......................... H04N 7/16; H04N 5/445; G06F 3/00; G06F 13/00
(52) U.S. Cl. ....................... 725/136; 725/135; 725/139; 725/51
(58) Field of Search ................... 725/135–139, 725/40, 51; 707/9–10, 500.1; 709/219–220; 717/127

(56) References Cited

U.S. PATENT DOCUMENTS

| | | | |
|---|---|---|---|
| 5,355,484 A | * 10/1994 | Record et al. .............. 717/127 |
| 5,774,666 A | 6/1998 | Portuesi ................. 395/200.48 |
| 5,818,441 A | 10/1998 | Throckmorton et al. .... 345/328 |
| 5,857,190 A | * 1/1999 | Brown ......................... 707/10 |
| 5,861,881 A | * 1/1999 | Freeman et al. ............ 707/501 |
| 5,931,908 A | * 8/1999 | Gerba et al. ................. 709/219 |
| 5,982,445 A | 11/1999 | Eyer et al. ................... 348/461 |
| 5,991,596 A | 11/1999 | Cunningham et al. ..... 455/12.1 |
| 6,097,441 A | 8/2000 | Allport ........................ 348/552 |
| 6,460,180 B1 | * 10/2002 | Park et al. ..................... 725/40 |

* cited by examiner

Primary Examiner—Andrew Faile
Assistant Examiner—Hai V. Tran
(74) Attorney, Agent, or Firm—Workman, Nydegger

(57) ABSTRACT

Interactive television content can be classified as either disconnected content or as connected content. An interactive television system involves some receivers that cannot establish connections to the Internet and therefore cannot properly process triggers to connected content. The system also involves other receiver units that can establish connections to the Internet and can process triggers to connected content. A trigger in accordance with the invention involves a "connected content/disconnected content" attribute that identifies the trigger as either a trigger to disconnected content or a trigger to connected content. Receiver units that cannot process triggers to connected content can therefore use the attribute to identify triggers to such connected content and can then ignore such triggers, while those receiver units that can process triggers to connect content can use those triggers to make the desired Internet connection.

27 Claims, 5 Drawing Sheets

INTERACTIVE TELEVISION TRIGGERS HAVING CONNECTED CONTENT/ DISCONNECTED CONTENT ATTRIBUTE

BACKGROUND INFORMATION

FIG. 1 (Prior Art) is a diagram of an interactive television system involving several different types of receiver units 100–104 that display information resources and television video. Receiver unit 100 is a personal computer that includes a specialized tuner and decoder expansion card. An example of one such expansion card is available from DirecTV, Inc, a unit of Hughes Electronics Corporation. Television video 105 is broadcast from a broadcaster's transmitting antenna 106 to a receiving antenna 107 of a satellite uplink station 108. The satellite uplink station 108 receives the television video on receiving antenna 107 and transmits the television video 105 to a satellite 109 via a transmitting dish 110. Satellite 109 in turn relays the television video 105 to a small satellite dish 111 of receiver unit 100. A viewer is able to view the television video 105 using the screen of the personal computer of receiver unit 100 as a display device. Rather than viewing the television video, the viewer can choose to view Internet content. Receiver unit 100 sends a request for the desired Internet content via an Internet connection 112, the Internet 113, and an Internet connection 114, to uplink station 108. Uplink station 108 receives the request, retrieves the requested Internet content from the Internet 113 via Internet connection 114, and sends the requested Internet content to receiver unit 100 via satellite 109.

Receiver unit 101 is another example of a DirecTV® receiver unit having a special tuner and decoder expansion card and small satellite dish. Although receiver unit 101 is not connected to the Internet, receiver unit 101 can nevertheless display certain information resources and/or Internet content that is provided by the uplink station 108. An electronic newspaper is an example of such an information resource. Uplink station 108 retrieves the information resource (the electronic newspaper) from the Internet via its Internet connection 114, and then transmits that information resource to receiver unit 101 by encoding the information resource into broadcast television video signal 105. Receiver unit 101 receives the broadcast television video signal 105, decodes it to recover the information resource, and displays the information resource for viewing. A viewer is therefore able to switch from watching television to browsing through the various pages of the electronic newspaper even though receiver unit 101 has no connection to the Internet.

In contrast to DirecTV® receiver units 100 and 101 which principally display either television content or an information resource, receiver units 102–104 are considered interactive television receiver units. In interactive television, information from an information resource may be displayed along with television video in a synchronized fashion. When information is to be displayed at a point in the television video, a communication called a "trigger" is broadcast along with the television video. The trigger identifies the information resource and indicates how information from the information resource is to be displayed.

Receiver unit 102 is a personal computer that has a television tuner card. One example of such a receiver unit is the "Windows® 98 Broadcast PC" system which includes a personal computer with the Windows® 98 operating system and a television tuner card. Windows® 98 is developed by and available from Microsoft Corporation of Redmond, Wash. In accordance with this system, an information resource is encoded into vertical blanking interval (VBI) lines 10–20 of an NTSC (National Television Standards Committee) broadcast television signal so that the information resource is transmitted to the receiver unit 102 along with the television video 105. At an appropriate time in the television video 105 when the information resource is to be displayed to enhance the television viewing experience, a trigger is broadcast. The trigger identifies the information resource and also serves as a queue to receiver unit 102 to display the information resource along with the television video. Receiver unit 102 responds to the trigger and displays the indicated information resource provided that the information resource has been transmitted to the receiver unit 102.

Receiver unit 103 is another type of interactive television receiver unit. In contrast to receiver units 100–101, receiver unit 103 retrieves information resources from the Internet that are identified by triggers. An example of such a receiver unit is a WebTV® set-top box Internet terminal. Television video 105 is broadcast from broadcast antenna 106 and is received on an antenna 115 of receiver unit 103. Consider the situation in which the broadcaster transmits a trigger that offers a viewer an option to buy an item by filling out an order form. At an appropriate time in television video 105, the broadcaster broadcasts a trigger 116 along with the television video. This trigger 116 causes receiver unit 103 to display an icon that offers the viewer the option of buying the item. If the viewer selects the icon using a handheld remote control unit 117, then receiver unit 103 retrieves from the Internet 113 via an Internet connection 118 an order form web page 119 identified by the trigger. Once the order form web page 119 has been retrieved from the Internet and displayed, the viewer can interact with the order form, enter user-specific information, and submit the user-specific information back to a merchant's server on the Internet. It is therefore seen that receiver unit 103 enhances the television viewing experience by retrieving the information resource 119 identified by the trigger 116 and then displaying that information resource.

Receiver unit 104 is another example of another WebTV® interactive television receiver unit. This receiver unit 104, unlike receiver unit 103, is not able to retrieve an identified information resource from Internet 113. It is, however, nevertheless able to provide an interactive television experience. Consider the situation in which a series of information resources are already present on receiver unit 104 (for example, they may have been received in advance via VBI line 10–20 transport or they may be already be present on receiver unit 104 in the form of a compact disk of other storage medium). At various points in the broadcast television video 105, the broadcaster may transmit triggers identifying the information resources resident on receiver unit 104. These triggers may then cause the display of these information resources thereby enhancing the television viewing experience, provided that receiver unit 104 does not have to access the Internet to get information resources.

It is desired to be able to transmit triggers that utilize the full capabilities of both WebTV® receiver units 103 and 104, but a problem arises. If trigger 116 for the order form were transmitted to receiver unit 103, then that trigger 116 would also be received by receiver unit 104. This trigger 116 may cause the viewer at receiver unit 104 to be presented with an icon offering the viewer the option of ordering an item, wherein if the viewer selects the icon the item could not be ordered because the order form 119 could not be accessed. A solution is desired whereby the full capabilities of a receiver unit like receiver unit 103 and a receiver unit like receiver unit 104 can both be utilized in the same system.

SUMMARY

In one embodiment, interactive television content is classified as either "disconnected content" or as "connected content". In accordance with one such classification, disconnected interactive television content is content that, once present on the receiver unit, likely involves no further connection to the Internet. Connected content, on the other hand, is interactive television content that likely does involve an Internet connection.

An interactive television system in accordance with this embodiment involves some receivers that cannot establish connections to the Internet and therefore cannot properly process triggers to connected content. The system also involves other receiver units that can establish connections to the Internet and can process triggers to connected content. A trigger in accordance with this embodiment involves a connected content/disconnected content attribute that identifies the trigger as being either a trigger to disconnected content or a trigger to connected content. Receiver units that cannot process triggers to connected content can therefore use the attribute to identify triggers to such connected content and to ignore such triggers. Receiver unit failures and/or the display of options that are inoperative due to an inability to connect to the Internet are thereby prevented. Receiver units in the system that can establish connections to the Internet, on the other hand, can receive and execute both triggers to connected content and triggers to disconnected content. A functioning system having both types of receiver units is therefore possible.

In another embodiment, a relay station relays broadcast television video to receiver units that cannot establish connections to the Internet. This relay station uses the connected content/disconnected content attributes to identify disconnected content triggers, to retrieve the identified disconnected content from the Internet, and to relay that disconnected content to the receiver units. The relay station may, for example, encode such disconnected content into vertical blanking interval (VBI) lines 10–20 of an NTSC broadcast television video signal being relayed. The relay station also relays the triggers to the disconnected content. Because the receiver units receive both the disconnected content as well as the associated triggers from the relay stations, the receiver units can provide an interactive television experience using the disconnected content despite their inability to establish connections to the Internet.

In another embodiment, two triggers are broadcast for an enhancement. The first trigger alerts the relay station that disconnected content is to be prefetched from the Internet. The relay station prefetches the disconnected content identified by the first trigger from the Internet and relays it to the receiver units (for example, via VBI lines 10–20 of an NTSC broadcast television video signal) before the second trigger that actually triggers the enhancement on the receiver unit is received. In this way, the disconnected content is already present on the receiver unit when the second trigger arrives at the receiver unit. Accordingly, latency associated with having to retrieve and relay disconnected content identified by triggers is reduced.

Other aspects of the invention and other embodiments are described in the detailed description below. This summary does not purport to define the invention. The invention is defined by the claims.

DETAILED DESCRIPTION

An interactive television trigger in accordance with an embodiment of the present invention has a "connected content/disconnected content" attribute that identifies the trigger either as a connected content trigger or as a disconnected content trigger. In this embodiment, a connected content trigger is a trigger which if executed by the receiver unit is likely to require connection to a remote information store (for example, a connection to the Internet, a direct dial-up connection to a server such as a WebTV® server, and/or a connection to a server where the connection does not entail TCP/IP) or to require an Internet communication. A disconnected content trigger, on the other hand, is a trigger which if executed by the receiver unit is not likely to involve a connection to a remote information store or an Internet communication. Accordingly, a receiver unit that is not able to establish such a connection can identify and ignore connected content triggers by examining the connected content/disconnected content attribute values of incoming triggers.

Figure 3:
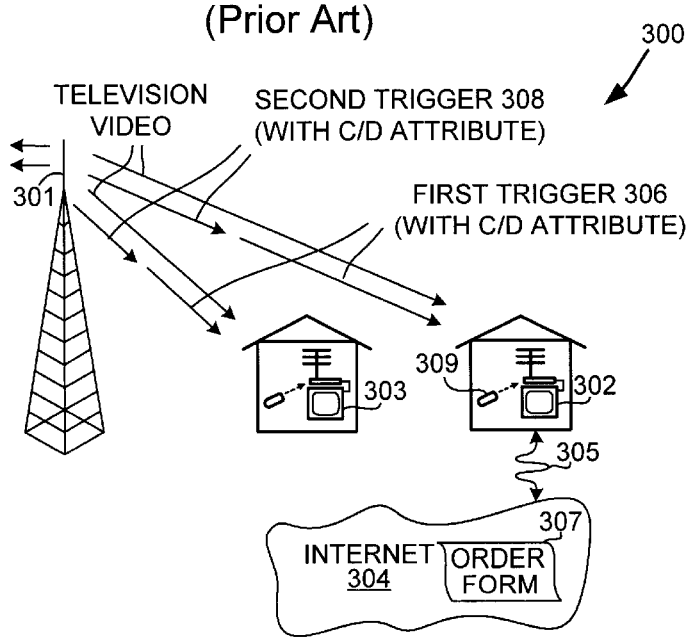
FIG. 3 is a simplified diagram of a system for carrying out the method of FIG. 2.
Figure 2:
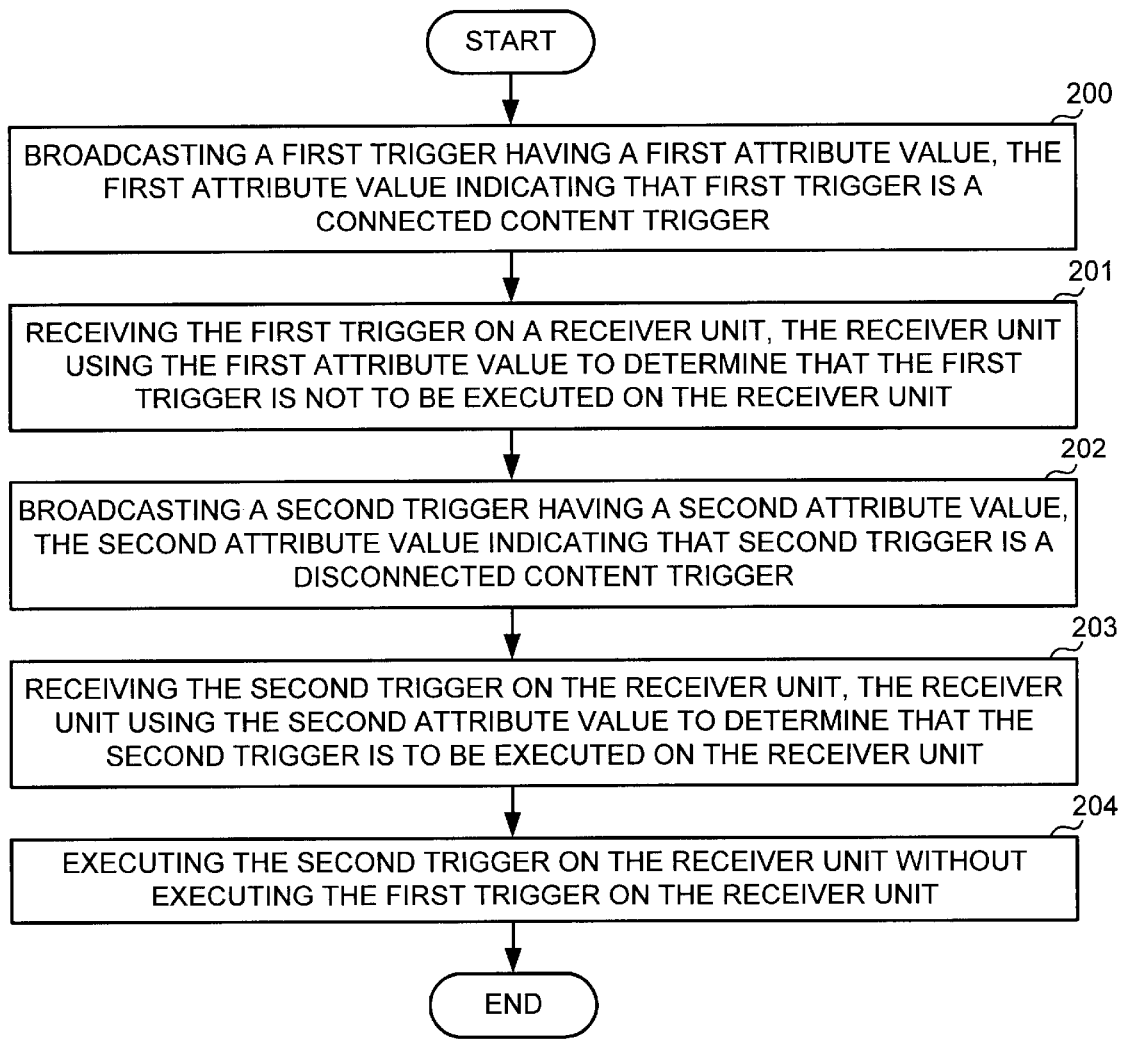
FIG. 2 is a flowchart of a method in accordance with one embodiment of the present invention.

FIG. 2 is a flowchart of a method in accordance with one embodiment of the present invention. FIG. 3 is a simplified diagram of a system 300 for carrying out the method of FIG. 2. System 300 involves a broadcasting antenna 301, a first interactive television receiver unit 302, and a second interactive television receiver unit 303. In one embodiment, receiver units 302 and 303 are WebTV® set-top Internet Terminals as described in the following documents: U.S. patent application Ser. No. 09/099,118, entitled "Communicating Logic Addresses Of Resources In A Data Service Channel Of A Video Signal", filed Jun. 17, 1998, by Daniel J. Zigmond, et al.; U.S. patent application Ser. No. 09/295,746, entitled "Enabling And/Or Disabling Selected Types Of Broadcast Triggers", filed Apr. 20, 1999, by Park, et al.; and U.S. patent application Ser. No. 09/295,436, entitled "Receiving An Information Resource From The Internet If It Is Not Received From A Broadcast Channel", filed Apr. 20, 1999, by Zigmond, et al. (the content of these documents is incorporated herein by reference). Receiver units 302 and 303 may, however, be other types of receiver units including a personal computer having a television tuner card such as the "Windows® 98 Broadcast PC" system.

First receiver unit 302 is connected to the Internet 304 via an Internet connection 305, whereas second receiver unit 303 has no such connection to Internet 304. Internet connection 305 may be any suitable connection including a POTS (plain old telephone system) connection, an Integrated Services Digital Network (ISDN) connection, a T1 connection, a fiber optic link, or a cable modem connection. The connection may involve a dial-up connection.

Figure 4:
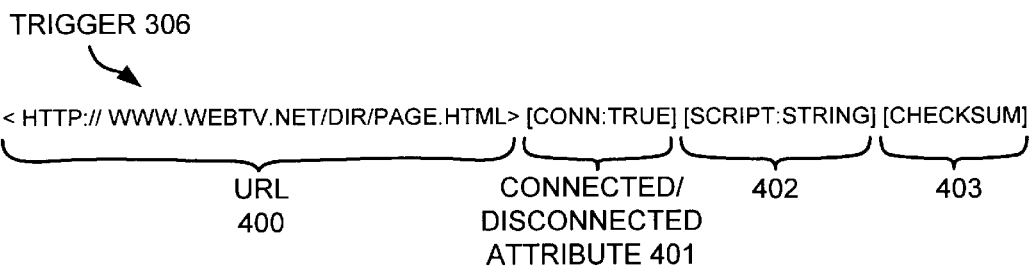
FIG. 4 is a simplified diagram of a trigger having a connected content/disconnected content attribute.

In a first step (step 200), a first trigger 306 having a connected content/disconnect content attribute value indicating that the trigger is a connected content trigger is broadcast from broadcasting antenna 301 to the first and second receiver units 302 and 303. FIG. 4 is a simplified diagram of trigger 306. Trigger 306 includes a Uniform Resource Identifier (URI) 400 which in this case is a Uniform Resource Locator (URL), a connected content/disconnected content attribute 401, a script attribute 402, and a checksum 403. In some embodiments, the URI is a Uniform Resource Name (URN) rather than a Uniform Resource Name (URL). In one embodiment, trigger 306 has a syntax defined by the following documents: 1) Electronic Industries Association standard EIA-746A entitled "Transport of Internet Uniform Resource Locator (URL) Information Using Text-2 (T-2) Service", and 2) the Advanced Television Enhancement Forum Specification (ATVEF) specification, draft 1.1, revision 26 (the subject matter of these documents is incorporated herein by reference).

The first and second receiver units 302 and 303 receive the first trigger 306. To illustrate the method of FIG. 2, an example wherein first trigger 306 is a trigger for soliciting an order for an item is explained. The first trigger 306 is executed by the first receiver unit 302 such that the first receiver unit 302 executes a script identified by the script attribute 402. This script causes an icon to be displayed on the display of the first receiver unit 302. If the viewer of the first receiver unit 302 selects the icon using a handheld remote control unit 309 of the first receiver unit, then the first receiver unit 302 retrieves an order form web page 307 from the Internet 304 via Internet connection 305. Because first receiver unit 302 is able to execute this trigger and support the associated Internet communication to retrieve the order form, first receiver unit 302 need not examine the connected content/disconnected content attribute value of the trigger. In this embodiment, first receiver unit 302 executes triggers regardless of the value of the connected content/disconnected content attribute value.

In contrast to the first receiver unit 302, the second receiver unit 303 does not execute connected content triggers (such as first trigger 306 that likely involves communicating order form information via an Internet connection). The second receiver unit 303 receives the first trigger 306 and examines the connected content/disconnected content attribute value 401. In the case of first trigger 306, the value 401 is "TRUE" indicating that the first trigger 306 is a connected content trigger. The second receiver unit 303 uses this attribute value 401 to determine that it will not execute, the first trigger 306.

Next (step 202), the broadcaster broadcasts a second trigger 308 having a connected content/disconnected content attribute value 401 of "FALSE" indicating that second trigger 308 is a disconnected content trigger. Second trigger 308, unlike first trigger 306, if executed on a receiver unit would not involve an Internet connection. An example of such a second trigger 308 is a trigger having a script which when executed causes an icon to be displayed on the screen of the receiver unit, where selection of that icon by a viewer allows the viewer to view an information resource already present on the receiver unit.

The first receiver unit 302 receives the second trigger 308 and executes it without regard to the value of the connected content/disconnected content attribute 401. The second receiver unit (step 303) receives the second trigger 308, examines the connected content/disconnected content attribute value 401, and uses the connected content/disconnected content attribute value (in this case "FALSE") to determine that the second trigger is to be executed on the second receiver unit 303. The second receiver unit then executes (step 204) second trigger 308.

Figure 1:
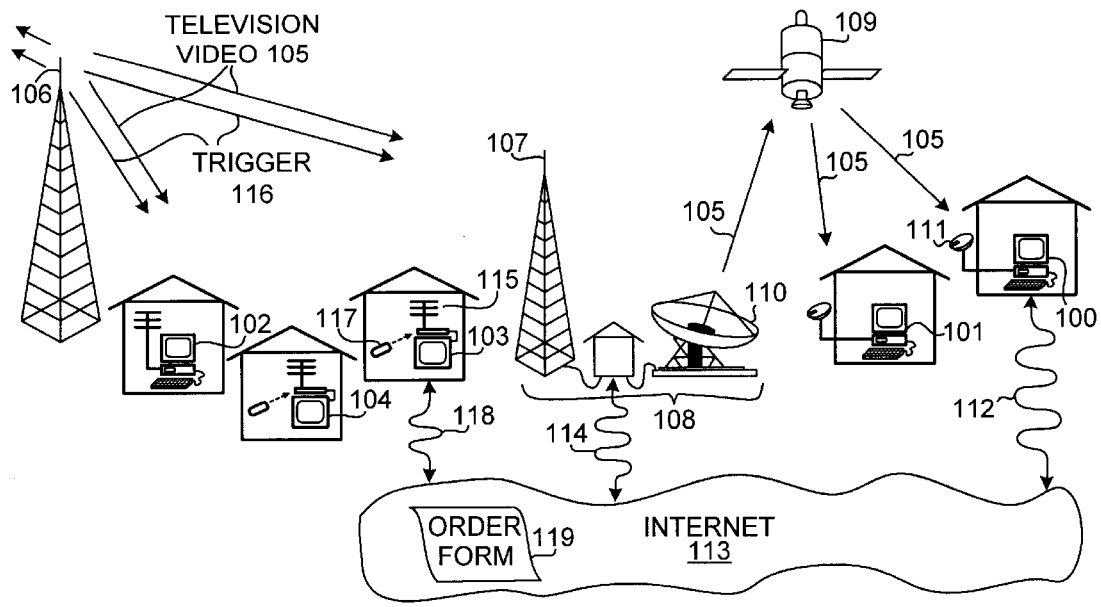
FIG. 1 (Prior Art) is a diagram of an interactive television system involving a satellite uplink station and several different types of receiver units.

Whereas in the example of FIG. 1 a receiver unit that does not have the capacity to handle connected content triggers may generate interactive content that is inoperative (for example, icons which if selected do not retrieve information from the Internet as they should), the second receiver unit 303 in accordance with this embodiment does not execute such connected content triggers and the associated inappropriate and inoperative icons are not generated. On the other hand, receiver units such as first receiver unit 302 that are capable of executing such connected content triggers, do receive such connected content triggers and are free to execute them. The connected content/disconnected content attribute of the present invention therefore provides for a broadcast interactive television system involving receiver units of different capabilities. The receiver units that are unable to properly execute and support connected content triggers detect and ignore such triggers, while the receiver units that can properly execute and support connected content triggers receive and execute those triggers.

Although the connected content/disconnected content attribute set forth in connection with FIG. 2 indicates that the trigger is either a connected content trigger or a disconnected content trigger, other connected content/disconnected content attributes are possible. In one example, the attribute value if present in the trigger indicates that the trigger is a connected content trigger, but there is no attribute or value if the trigger is a disconnected content trigger. In such a case, receiver unit 303 that does not have Internet communication ability ignores triggers having the attribute, but otherwise executes triggers that do not have the attribute.

Alternatively, the attribute value if present in a trigger indicates that the trigger is a disconnected content trigger, but there is no attribute or value if the trigger is a connected content trigger. In such a case, receiver unit 303 that does not have Internet communication ability ignores triggers that do not have the attribute, and allows execution of triggers that do have the attribute.

In other embodiments, the connected content/disconnected content attribute indicates the degree to which execution of the trigger is likely to entail an Internet communication. The attribute values can, for example, be numbers that range from zero (zero percent likelihood of involving an Internet communication) to one hundred (a one hundred percent likelihood of involving an Internet communication). Receiver units can make determinations on whether to execute a trigger having such a connected content/disconnected content attribute based on the magnitude of this number. Although the triggers in connection with the method of FIG. 2 are classified into one of two classes (into the connected content trigger class or into the disconnected content trigger class), triggers can be classified into one of three or more classes in some embodiments.

In one embodiment, content is determined to be connected content if more than a predetermined percentage A of all the hypertext links in the content point to information resources on the receiver unit. Likewise, content is determined to be disconnected content if less than a predetermined percentage B of all the hypertext links point to information resources on the receiver unit. In one embodiment, A=B and A is ninety-five percent. Alternatively, content is considered connected content in one embodiment if execution of an associated trigger identifying that content without more viewer input does not result in the display of any web content. Alternatively, content is considered connected content in another embodiment if any image on a page directly identified by the URI of an associated trigger includes any image that will not load due to not being able to retrieve image information from a remote information store.

In the method of FIG. 2, the second receiver unit 303 does not execute connected content triggers. In the case of first trigger 306, the icon displayed on first receiver unit 302 does not appear on receiver unit 303. Other embodiments are, however, possible. In one embodiment, second receiver unit 303 executes connected content triggers (for example, by displaying the icon in the case of first trigger 306), but also takes other actions to improve viewer experience due to not being able to access the Internet. Receiver unit 303 may, for example, display a message to the viewer that selecting the icon will have no effect because the receiver unit 303 does not have Internet connectivity.

In some embodiments, a receiver unit stores connectivity information that is indicative of whether the receiver unit is connected to a remote information store (for example, is able to establish a connection to the Internet sufficient to execute a connected content trigger), or whether the receiver unit is not connected to the remote information store (for example, is not able to establish a connection to the Internet sufficient to execute the connected content trigger). The connectivity information may, for example, be a variable stored on the receiver unit. The variable having a first value indicates that the receiver unit is connected to the Internet in this sense whereas the variable having a second value indicates that the receiver unit is not connected to the Internet in this sense. In one embodiment of the method of FIG. 2, the receiver unit makes the determinations in steps 201 and 203 using both: 1) the connectivity information stored on the receiver unit, and 2) the value of the connected content/disconnected content attribute of the incoming triggers. If, for example, the connectivity information were to indicate that the receiver unit is not connected to the Internet, then the receiver unit in this embodiment would determine that a connected content trigger (as indicated by its connected content/disconnected content attribute) is not to be executed. On the other hand, if the connectivity information were to indicate that the receiver unit is connected to the Internet, then the receiver unit in this embodiment would determine that a connected content trigger (as indicated by its connected content/disconnected content attribute) is to be executed.

Figure 5:
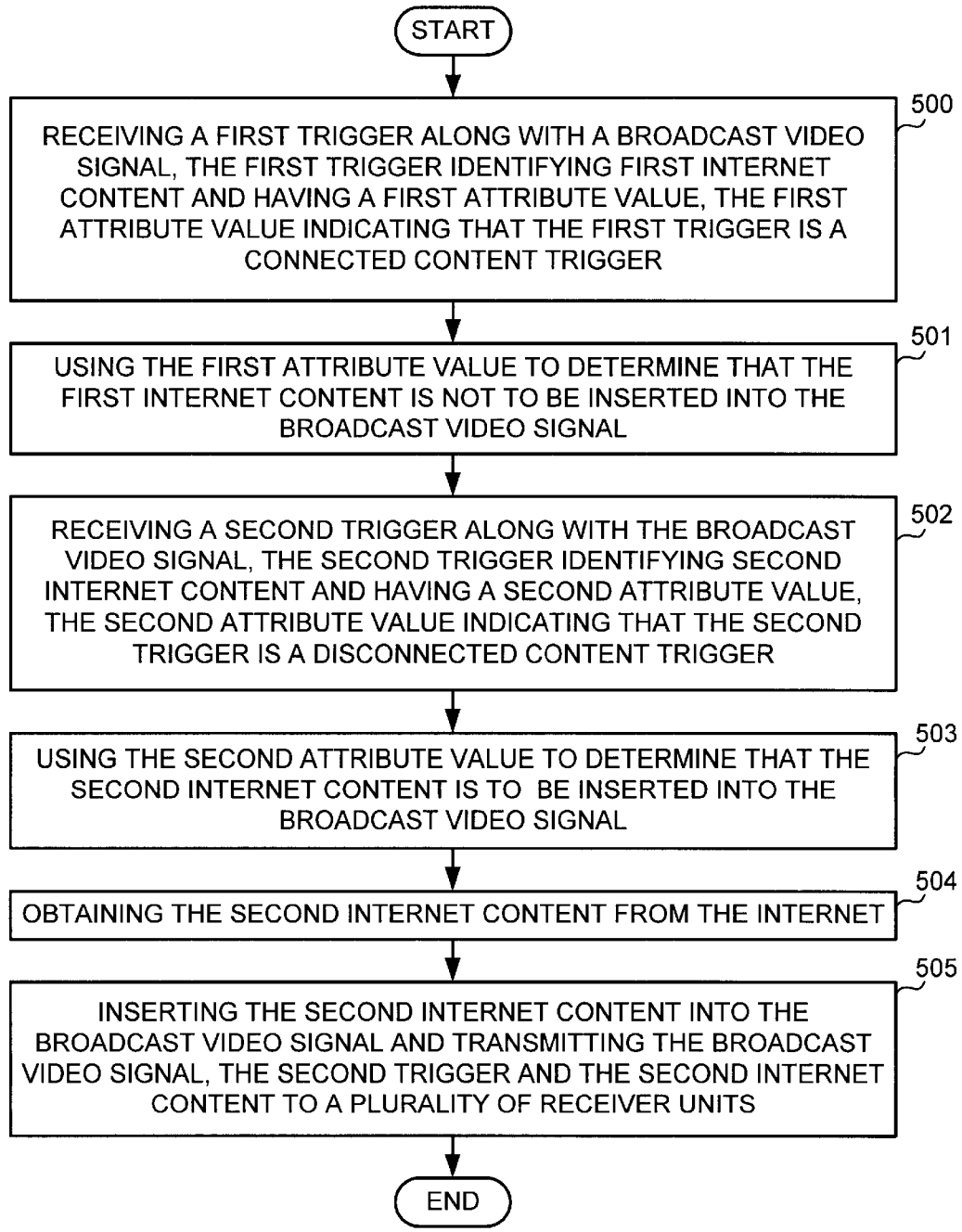
FIG. 5 is a flowchart of a method in accordance with another embodiment of the present invention.
Figure 6:
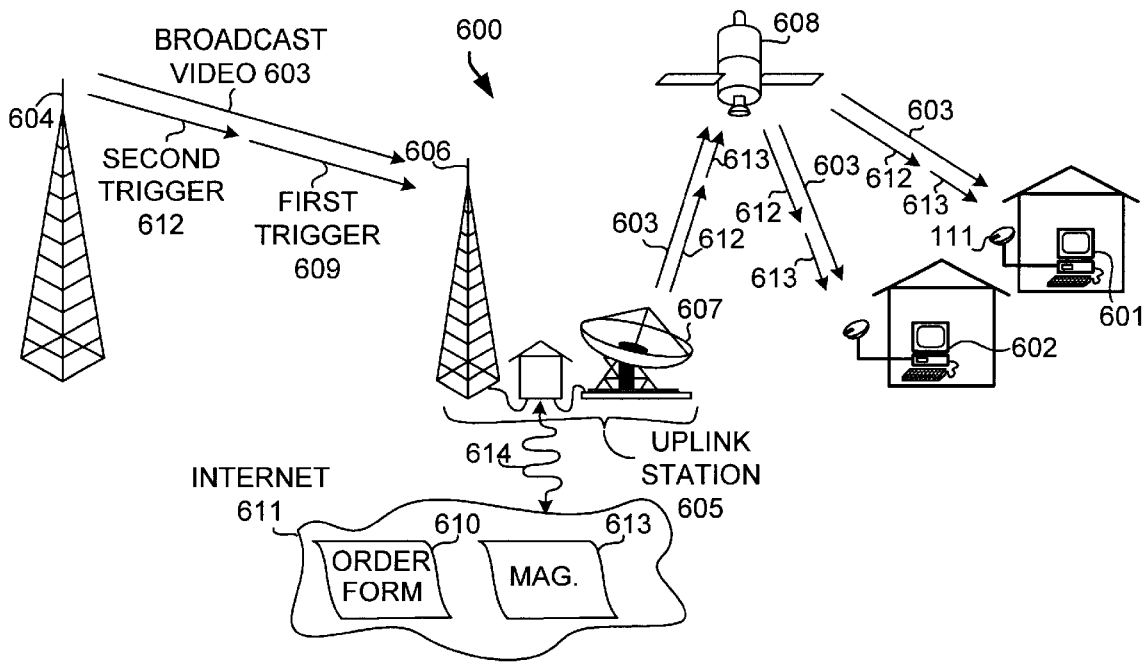
FIG. 6 is a simplified diagram of an interactive television system that carries out the method of FIG. 5.

FIG. 5 is a flowchart of a method in accordance with another embodiment of the present invention. FIG. 6 is a simplified diagram of a system 600 that carries out the method of FIG. 5. System 600 involves a group of receiver units 601 and 602 that do not have Internet access. These receiver units cannot therefore retrieve information resources from the Internet and cannot properly execute connected content triggers. These receiver units can be receiver units that are able to connect to the Internet but for some reason will not connect and consequently are effectively disconnected during the relevant time period.

Consider a situation in which a web page is viewed on receiver unit 601 that contains a hypertext link to another web page that is not on receiver unit 601. If a viewer were to select the hypertext link, then receiver unit 601 would not be able to retrieve the web page identified by the link. Degraded viewer experience and/or failures may result. The content is connected content and the receiver unit does not have a connection to the Internet. If, on the other hand, the web page identified by the link were also present on receiver unit 601 and neither of the web pages contained links to web pages not on receiver unit 601, then the two web pages together constitute disconnected content. A viewer would be able to flip through these pages and exercise all hypertext links on the pages without selecting inoperative links and/or suffering a poor viewer experience.

The method set forth in the flowchart of FIG. 5 allows receiver units such as receiver units 601 and 602 to receive and display disconnected content, but prevents these receiver units from receiving and displaying connected content which if acted upon by the receiver unit may result in a degraded viewer experience.

In a first step (step 500), broadcast television video 603 is broadcast from a broadcaster's transmitting antenna 604 to a relay station 605. In the illustrated example, the relay station 605 is a satellite uplink station that relays broadcast television video it receives on a receiving antenna 606 to receiver units 601 and 602 via satellite dish 607 and satellite 608.

A first trigger 609 that is a connected content trigger is transmitted along with the broadcast video. First trigger 609 has a connected content/disconnected content attribute value that indicates that the trigger is a connected content trigger. In the presently explained example, the first trigger 609 is a trigger that solicits an order for an item. If the trigger 609 is executed on a receiver unit, then a script in the trigger causes an icon to be displayed on the screen of the receiver unit. The icon queries the viewer whether the viewer wishes to order the item. First trigger 609 contains a URI that identifies an order form web page 610 (first Internet content) on the Internet 611 such that if the viewer selects the icon, then the receiver unit uses the URI to retrieve the order form web page 610 (first Internet content) from the Internet. After the viewer interacts with the order form web page 610 and supplies user information to make the order, the user information is sent to another Internet destination (for example, a merchant's server) where the order is logged. In this example, the order form web page 610 is considered connected content because even if this web page were loaded into a receiver unit, responding to the web page would cause user information to be transmitted to the Internet destination where it would be logged. It is therefore not desired to load such connected Internet content (the first Internet content 610 identified by the first trigger) into receiver units 601 and 602 that do not have connections to the Internet 611.

Accordingly, the satellite uplink station 605 uses the first attribute value (step 501) of first trigger 609 to determine that first trigger 609 is a connected content trigger and that the identified first Internet content 610 (for example, an order form web page) is not to be inserted into the broadcast video signal 603. Uplink station 605 relays neither first trigger 609 nor first Internet content 610 to satellite 608 and receiver units 601 and 602.

Next, a second trigger 612 is broadcast from broadcaster's antenna 604 and is received by uplink station 605 (step 502). Second trigger 612 contains a connected content/disconnected content attribute value that indicates that the second trigger 612 is a disconnected content trigger. The second trigger 612 contains a URI that identifies second Internet content 613 which if present on receiver units 601 and 602 would afford a disconnected interactive viewing experience. In the illustrated example, second trigger 612 is a trigger which when executed causes an icon to be displayed on the screen of the receiver unit. The icon informs the viewer that an online magazine can be viewed. If the viewer selects the icon, then a page of the online magazine is displayed. The viewer can flip from page to page of the magazine by selecting hypertext links on the magazine pages. All hypertext links within the magazine point to other locations within the magazine. Accordingly, were all the pages of the magazine on the receiver unit, then a viewer could proceed from hypertext link to hypertext link through the various pages of the magazine without ever branching out to an Internet information resource that is not present on the receiver unit. The magazine (second Internet content 613) is therefore considered to be disconnected content.

Next (step 503), the uplink station 605 examines the connected content/disconnected content attribute value of the second trigger 612, determines that the second trigger 612 is a disconnected content trigger, and uses that value to determine that the second Internet content 613 is to be inserted into the broadcast video signal 603. The uplink facility 605 uses the URI of the second trigger 612 to retrieve the second Internet content 613 from the Internet 611. Retrieval is fast due to the use of a high speed Internet connection 614.

In some embodiments, the second Internet content 613 involves many interlinked web pages and the uplink station 605 "walks the tree" of web pages to determine the extent of the associated web pages. In other embodiments, the content author includes in the first page of the second Internet content 613 a table that lists all the hypertext links that are considered to define the tree of web pages of the second Internet content 613. Uplink station 615 uses this list to uproot the tree of the second Internet content 613 as desired by the content provider.

Once the second Internet content 613 is retrieved, uplink station 605 inserts it into the broadcast video signal 603 and transmits the broadcast video signal 603 with the second Internet content to the receiver units 601 and 602 via satellite 608. In one embodiment, the second Internet content 613 is encoded into vertical blanking internal (VBI) lines 10–20 of the broadcast video signal 603 in accordance with Electronic Industries Association standard EIA-516 entitled "Joint EIA/CVCC Recommended Practice for Teletext: North American Basic Teletext Specification (NABTS)" (the contents of which is incorporated herein by reference).

The second Internet content 613 (for example, an on-line magazine) is therefore retrieved by the uplink station 605 from the Internet 611 and is relayed to the receiver units 601 and 602. Once the second Internet content 613 is present on receiver units 601 and 602, the uplink facility 605 relays the associated second trigger 612. The receiver units 601 and 602 receive the second trigger 612 and execute it. In the case of second Internet content 613 being an on-line magazine, the second trigger 612 can cause an icon to be displayed informing a viewer that the on-line magazine is now resident on the receiver unit and can be viewed by selecting the icon. It is therefore seen that the uplink station 605 retrieves disconnected content from the Internet and inserts it into the broadcast video so that the disconnected content will be available on the receiver units when the receiver units receive associated disconnected content triggers. Receiver units which do not have Internet access are therefore nevertheless able to view and interact with the disconnected content. The uplink station 605 does not, however, retrieve and relay connected content and associated connected content triggers which if acted upon by the receiver units could cause failures and/or inoperative features to be offered to viewers.

Figure 7:
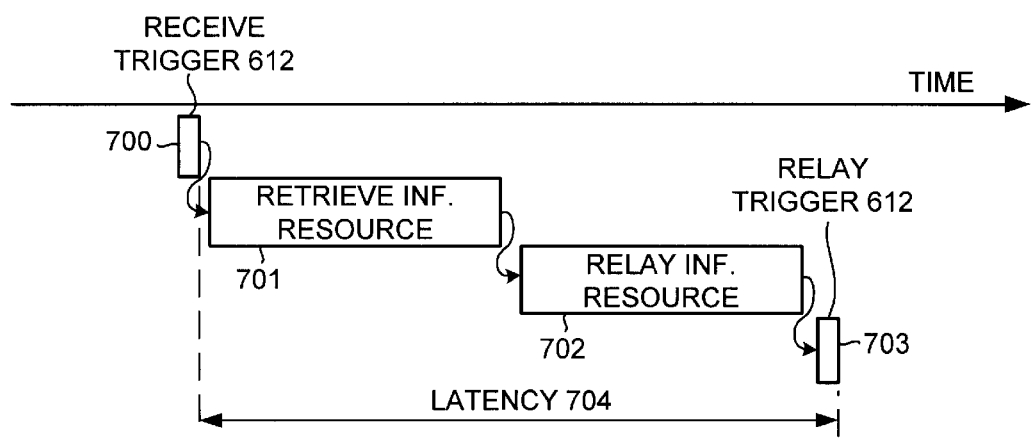
FIG. 7 is a simplified diagram that illustrates a potential latency problem associated with the method of FIG. 5.

FIG. 7 is a simplified diagram of a potential problem associated with the insertion method of FIGS. 5 and 6. Time extends from left to right as indicated by the arrow labeled "TIME". As explained above in connection with FIGS. 5 and 6, disconnected content trigger 612 is received by the uplink station 605. The time associated with this operation is illustrated in FIG. 7 by the upper left-most box 700 in FIG. 7. Next, the uplink station 605 retrieves the information resource 613 identified by the disconnected content trigger 612. The time associated with this operation is illustrated by the next box 701 to the right. Next, the uplink station 605 inserts the information resource 613 into the broadcast signal 603 so that the information resource is transmitted to the receiver units 601 and 602. The time associated with this operation is illustrated by the next box 702 to the right. In some embodiments, the relaying of a first part of the information resource may overlap the retrieval of a last part of the information resource. Next, the uplink station 605 relays the trigger 612. The time associated with this operation is illustrated by the next box 703 to the right. Assuming that the associated video 603 has been relayed without significant delay, it is seen that receipt of the trigger 612 by the receiver units is delayed due to the retrieval operation by a latency period 704. This latency period 704 is generally undesirable because the trigger 612 may be intended to "trigger" an enhancement associated with the information resource at a particular time in the video. If the trigger 612 is delayed with respect to the video, then the timing of the enhancement may also be delayed. A solution is desired.

Figure 8:
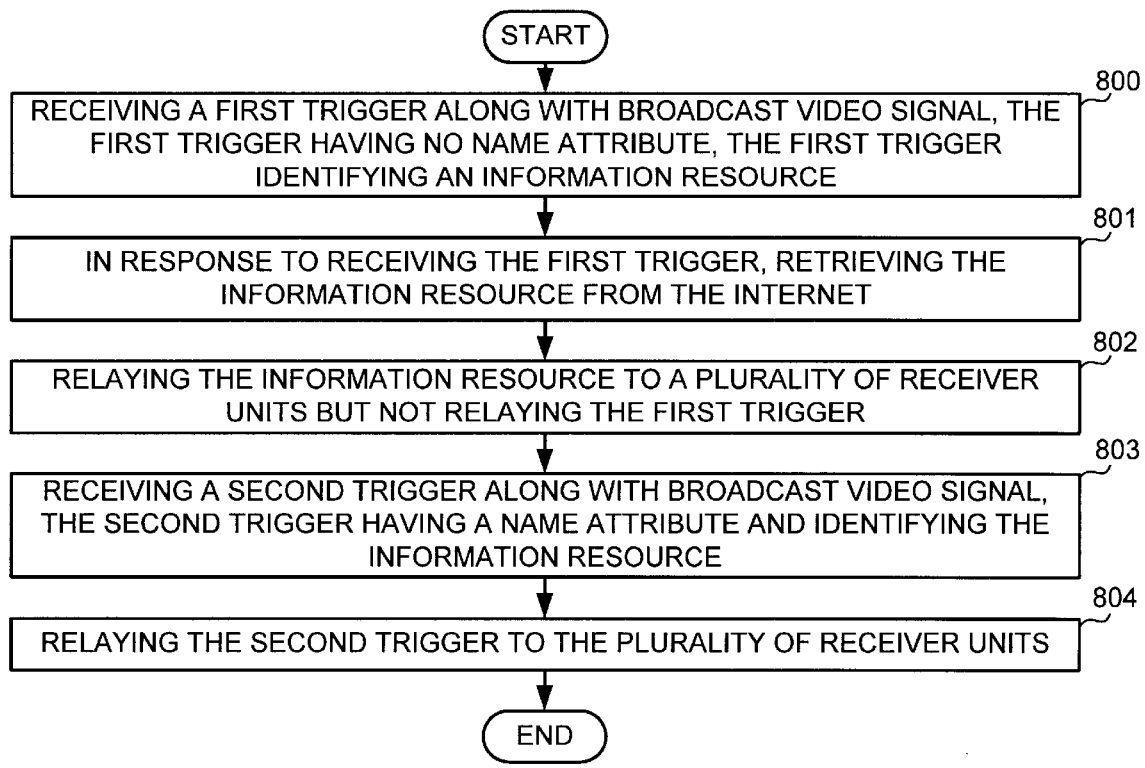
FIG. 8 is a flowchart of the method in accordance with another embodiment of the present invention.
Figure 9:
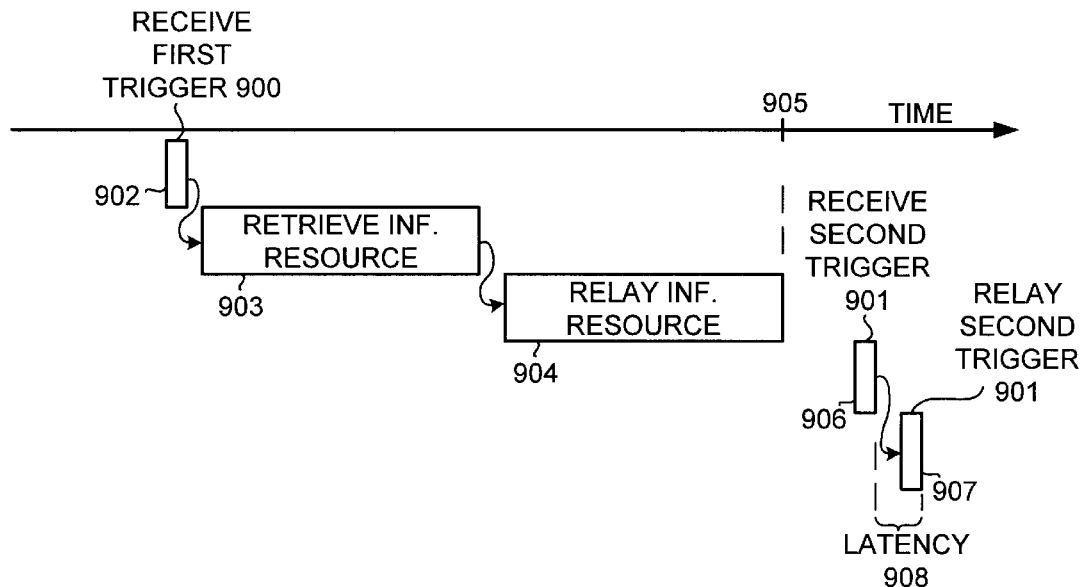
FIG. 9 is a simplified diagram that illustrates the method of FIG. 8.

FIG. 8 is a flowchart of a method in accordance with another embodiment of the present invention. FIG. 9 is a simplified diagram illustrating the method of FIG. 8. Two triggers 900 and 901 are broadcast rather than one. The first trigger 900 is used not to trigger the enhancement at the receiver units, but rather is used to queue the uplink station to retrieve in advance of the second trigger (i.e., to prefetch) the associated information resource. The second trigger 901 is the trigger that actually "triggers" the enhancement at the receiver units to synchronize the enhancement and the video. The uplink station may distinguish such a first trigger 900 from such a second trigger 901 by one of many methods. In one embodiment, a first trigger is a disconnected content trigger that is tagged in such a way to distinguish a second trigger. In one example, a first trigger is distinguished from a second trigger because the first trigger does not have a name attribute, whereas a second trigger has a name attribute but is otherwise identical to the first trigger. In another embodiment, the first trigger has a time attribute indicative of a future time at which the trigger is to be executed. When such a trigger is received having such a future time of execution, the uplink station determines from the time attribute that there is enough time before execution to prefetch an information resource identified by the trigger. The uplink station then prefetches that information resource and relays the information resource to the receiver units before receipt of the second trigger.

In a first step (step 800), the first trigger 900 is received at the uplink station along with the broadcast video 603. The first trigger 900 is a disconnected content trigger that has no name attribute and that identifies an information resource on the Internet. The time associated with the receipt of this first trigger 900 is illustrated in FIG. 9 by leftmost box 902.

Next (step 801), in response to receiving the first trigger, the uplink station retrieves (prefetches) the information resource identified by the first trigger. The time associated with this retrieval is illustrated in FIG. 9 by the box 903 next to the right.

Next (step 802), the uplink station relays the information resource to the receiver units 601 and 602. The time associated with this relaying is illustrated in FIG. 9 by the box 904 next the right. In one embodiment, the first trigger 900 is not relayed because the first trigger 900 is not used to "trigger" an enhancement on the receiver units. In some embodiments, the relaying of a first part of the information resource overlaps the retrieval of a last part of the information resource. In other embodiments there is no overlap as illustrated in FIG. 9. In the illustrated example, the retrieval and relaying of the information resource is completed at time 905.

Next (step 803), the uplink station receives the second trigger 901. This second trigger is identical to the first trigger 901 except that it has a name attribute. When the uplink station receives such a second trigger that identifies an information resource that it has already relayed, the uplink station relays the second trigger (step 804) to the receiver units. The time associated with the reception of the second trigger 901 by the uplink station is illustrated in FIG. 9 as box 906. The time associated with the relaying of the second trigger 901 by the uplink station is illustrated in FIG. 9 as box 907. The latency period 908 between the reception of the second trigger 901 by the uplink facility and the relaying of the second trigger 901 to the receiver units is reduced by the prefetching of the information resource. It is therefore seen that the triggering of the enhancement on the receiver units on the receiver units is not delayed with respect to the broadcast video due to the need to retrieve the information resource. The information is already prefetched and present on the receiver units when the second trigger 901 is received by the uplink station.

Although the present invention is described in connection with certain specific embodiments for instructional purposes, the present invention is not limited thereto. Broadcast television formats other than the NTSC format can be employed including: the Phase Alternate Lines (PAL) format, the Sequential Couleur Avec Memoire (SECAM) format, and the High Definition Television (HDTV) or digital television format. Application of the connected content/disconnected content attribute is not limited to the interactive television context, but rather applies more broadly to triggers in general including the use of triggers in non-video applications, including (but not limited to) digital radio. Application of the connected content/disconnected content attribute also applies outside the context of triggers and applies more broadly to the prefetching and relaying of information to multiple receiver units. Although a satellite uplink station is described as an example of a relaying station, it is understood that other types of relaying stations can make use of the connected content/disconnected content attribute including cable television stations where television video is supplied (for example, via fiber optic cable or coaxial cable) to a plurality of receiver units. A relaying station need not receive broadcast video from the broadcaster over the airwaves via terrestrial transmission, but rather may receive the broadcast video via a dedicated feed (for example, via a fiber optic or coaxial cable link). Although the connected content/disconnected content attribute is described as facilitating prefetching information from the Internet, the connected content/disconnected content is also applicable to prefetching information not in a cache on the receiver unit and/or to prefetching information from another source of information that is not on the receiver unit. The information retrieved by the relaying station for subsequent relaying to receiving stations and/or insertion into a video signal need not be retrieved from the Internet, but rather may be locally available in an information store at the relaying station. Such information may be stored on any computer-readable medium. Similarly, software that carries out steps of methods in accordance with the present invention can be stored on a computer-readable medium. Examples of computer-readable mediums include magnetic and optical storage media and semiconductor memory. Triggers used in embodiments of the invention can be triggers that identify templates as set forth in U.S. patent application Ser. No. 09/345223, entitled "Methods And Apparatus For Broadcasting Interactive Advertising Using Remote Advertising Templates", by Blackketter, et al., filed Jun. 30, 1999 (the subject matter of which is incorporated herein by reference). Accordingly, various modifications, adaptations, and combinations of various features of the described embodiments can be practiced without departing from the scope of the invention as set forth in the claims.

What is claimed is:

1. In an interactive television system comprised of a broadcast station for transmitting video content to either or both of i) one or more relay stations that in turn retransmit the video content for broadcasting, and ii) a plurality of individual receiver units each comprising a local computing system associated with a display for viewing both video and Internet content in an interactive manner, a method for presenting to the receiver units access to Internet content to enable interactive viewing of Internet content with received video content, but doing so in a manner that takes into account differences between different types of receiver units, namely, those capable of connecting to the Internet and those that are not, the method comprising:

receiving video content that includes a trigger which identifies certain Internet content;

said trigger being characterized by at least one attribute that identifies the trigger as either a connected or a disconnected content trigger that permits the different types of receiver units to process the trigger differently, so that receiving units that are connected to the Internet can process the trigger and then connect and download the identified Internet content, and those receivers that have no Internet connection, will selectively forego processing the trigger depending on whether the trigger is connected or a disconnected content trigger; and processing the received trigger to determine whether it is a connected or a disconnected trigger based on the particular attribute for the trigger that is present.

2. In an interactive television system comprised of a broadcast station for transmitting video content to either or both of i) one or more relay stations that in turn retransmit the video content for broadcasting, and ii) a plurality of individual receiver units each comprising a local computing system associated with a display for viewing both video and Internet content in an interactive manner, a computer program product comprised of a computer readable medium for carrying executable instructions for implementing a method for presenting to the receiver units access to Internet content to enable interactive viewing of Internet content with received video content, but doing so in a manner that takes into account differences between different types of receiver units, namely, those capable of connecting to the Internet and those that are not, and wherein the method is comprised of:

receiving video content that includes a trigger which identifies certain Internet content;

said trigger being characterized by at least one attribute that identifies the trigger as either a connected or a disconnected content trigger that permits the different types of receiver units to process the trigger differently, so that receiving units that are connected to die Internet can process the trigger and then connect and download the identified Internet content, and those receivers that have no Internet connection, will selectively forego processing the trigger depending on whether the trigger is connected or a disconnected content trigger; and processing the received trigger to determine whether it is a connected or a disconnected trigger based on the particular attribute for the trigger that is present.

3. A method as defined in claims 1 or 2, wherein when the attribute of the trigger identifies the trigger as a disconnected content trigger, then receiving units that are connected to the Internet can process the trigger and then connect and download the identified Internet content, and those receivers that have no Internet connection can also process the trigger and retrieve previously cached Internet content corresponding to the identified Internet content from the local computing system of the receiving unit.

4. A method as defined in claim 1 or 2, wherein successive triggers are received with the video content, each of the successive triggers being identified with an attribute so that each successive trigger is either a connected content trigger or a disconnected content trigger.

5. A method as defined in claim 3, wherein disconnected content is comprised of a plurality of web pages, the plurality of web pages including a plurality of hypertext links, and wherein substantially each of the hypertext links points to another web page of die disconnected content.

6. A method as defined in claim 3, wherein disconnected content is comprised of a web page comprising a plurality of links to referenced resources, and wherein the web page and substantially every one of the referenced resources is cached at the local computing system of the receiver unit.

7. A method as defined in claims 1 or 2, wherein connectivity information is stored on the receiver unit that is indicative of whether the receiver unit can establish a connection to a packet-switched network that is sufficient to execute a connected content type trigger.

8. A method as defined in claims 1 or 2, wherein receiving the video content is comprised of receiving the video content at a relay station before it is received at at least some of the receiving units, and if the trigger is a disconnected content trigger, then retrieving the identified Internet content and including it with the video content before retransmitting it from the relay station, and if the trigger is a connected content trigger, then simply retransmitting the video content with the trigger.

9. A method as defined in claim 8 wherein the video content is retransmitted to the plurality of receiver units via a satellite.

10. A method as defined in claim 8, wherein the video content is retransmitted to the plurality of receiver units via a coaxial cable.

11. A method as defined in claim 8, wherein the video content is retransmitted to the plurality of receiver units via a fiber optic cable.

12. A method as defined in claim 8; wherein the video content is retransmitted to the plurality of receiver units via an air terrestrial broadcast.

13. A method as defined in claim 8, wherein the video content is retransmitted to the plurality of receiver units in step (c) via a packet-switched network.

14. A method defined in claim 13, wherein the packet-switched network is the Internet.

15. A method as defined in claims 1 or 2, wherein when the attribute of the trigger identifies the trigger as a connected content trigger, then receiving units that are connected to the Internet can process the trigger and ten connect and download the identified Internet content, and those receivers that have no Internet connection can forego processing the trigger and retrieve previously cached Internet content corresponding to the identified Internet content from the local computing system of the receiving unit.

16. In an interactive television system comprised of a broadcast station for transmitting video content to either or both of i) one or more relay stations that in turn retransmit the video content for broadcasting, and ii) a plurality of individual receiver units each comprising a local computing system associated with a display for viewing both video and Internet content in an interactive manner, a method for presenting to the receiver units access to Internet content to enable interactive viewing of Internet content with received video content, but doing so in a manner that lakes into account differences between different types of receiver units, namely, those capable of connecting to the Internet and those that arc not the method comprising:

receiving at the receiving units video content that includes a trigger which identifies certain Internet content;

said trigger being characterized by the presence of one of two attributes in the sense that when a first attribute is present, the trigger is a connected content trigger that permits the different types of receiver units to process the trigger differently, so that receiving units that are connected to the Internet can process the trigger and then connect and download the identified Internet content, and those receivers that have no Internet connection, will forego processing the trigger, and when a second attribute is present, the trigger is a disconnected content trigger that permits the different types of receiver units to process the trigger differently, so that receiving units that are connected to the Internet can process the trigger and then connect and download the identified Internet content, and those receivers that have no Internet connection can also process the trigger and retrieve previously cached Internet content corresponding to the identified Internet content from the local computing system of the receiving unit;

processing the received trigger to determine which of the two attributes is present; and the different types of receiver units thereafter responding to the trigger in different ways so that receiver units that arc connected to the Internet respond to both connected and disconnected triggers, by being able to connect and download the identified Internet content from the Internet, while receiver units that are not connected to the Internet only respond to disconnected triggers, by being able to retrieve cached Internet content from the local computing system that corresponds to the identified Internet content.

17. In an interactive television system comprised of a broadcast station for transmitting video content to either or both of i) one or more relay stations that in turn retransmit the video content for broadcasting, and ii) a plurality of individual receiver units each comprising a local computing system associated with a display for viewing both video and Internet content in an interactive manner, a computer program product comprised of a computer readable medium for carrying executable instructions for implementing a method for presenting to the receiver units access to Internet content to enable interactive viewing of Internet content with received video content, but doing so in a manner that takes into account differences between different types of receiver units, namely, those capable of connecting to the Internet and those that are not, and wherein the method is comprised of:

receiving at the receiving units video content that includes a trigger which identifies certain Internet content;

said trigger being characterized by the presence of one of two attributes in the sense that when a first attribute is present, the trigger is a connected content trigger that permits the different types of receiver units to process the trigger differently, so that receiving units that arc connected to the Internet can process the trigger and then connect and download the identified Internet content, and those receivers that have no Internet connection, will forego processing the trigger, and when a second attribute is present, the trigger is a disconnected content trigger that permits the different types of receiver units to process the trigger differently, so that receiving units that are connected to the Internet can process the trigger and then connect and download the identified Internet content, and those receivers that have no internet connection can also process the trigger and retrieve previously cached Internet content corresponding to the identified Internet content from the local computing system of the receiving unit;

processing the received trigger to determine which of the two attributes is present; and the different types of receiver units thereafter responding to the trigger in different ways so that receiver units that are connected to the Internet respond to both connected and disconnected triggers, by being able to connect and download the identified Internet content from the Internet, while receiver units that arc not connected to the Internet only respond to disconnected triggers, by being able to retrieve cached Internet content from the local computing system that corresponds to the identified Internet content.

18. A method as defined in claims 16 or 17; wherein successive triggers are received with the video content, each of the successive triggers being identified with one or the oilier of said two attributes so that each successive trigger is either a connected content trigger or a disconnected content trigger.

19. A method as defined in claim 18, wherein disconnected content is comprised of a plurality of web pages, the plurality of web pages including a plurality of hypertext links, and wherein substantially each of the hypertext links points to another web page of the disconnected content.

20. A method as defined in claim 18, wherein disconnected content is comprised of a web page comprising a plurality of links to referenced resources, and wherein the web page and substantially every one of the referenced resources is cached at the local computing system of the receiver unit.

21. A method as defined in claims 16 or 17, and wherein connectivity information is stored on the receiver unit that is indicative of whether the receiver unit can establish a connection to a packet-switched network that is sufficient to execute a connected content type trigger.

22. A method as defined in claims 16 or 17, wherein the video content is received at the plurality of receiver units via a satellite.

23. A method as defined in claim 16 or 17, wherein the video content is received at the plurality of receiver units via a coaxial cable.

24. A method as defined in claims 16 or 17, wherein the video content is received at the plurality of receiver units via a fiber optic cable.

25. A method as defined in claims 16 or 17, wherein the video content is received at the plurality of receiver units via an air terrestrial broadcast.

26. A method as defined in claims 16 or 17, wherein the video content is received at the plurality of receiver units via a packet-switched network.

27. A method as defined in claim 26, wherein the packet-switched network is the Internet.

\* \* \* \* \*